United States Patent
Kawamura et al.

(12)

(10) Patent No.: US 10,378,922 B2
(45) Date of Patent: Aug. 13, 2019

(54) ROTATION ANGLE DETECTION APPARATUS

(71) Applicant: DENSO CORPORATION, Kariya, Aichi-pref. (JP)

(72) Inventors: Takuya Kawamura, Nishio (JP); Hirofumi Kinjou, Nishio (JP); Toru Wakimoto, Nishio (JP); Hideaki Nakayama, Kariya (JP); Masataka Yoshimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/544,612

(22) PCT Filed: Jan. 13, 2016

(86) PCT No.: PCT/JP2016/050852
§ 371 (c)(1),
(2) Date: Jul. 19, 2017

(87) PCT Pub. No.: WO2016/117430
PCT Pub. Date: Jul. 28, 2016

(65) Prior Publication Data
US 2017/0363444 A1    Dec. 21, 2017

(30) Foreign Application Priority Data

Jan. 19, 2015 (JP) ................... 2015-007707

(51) Int. Cl.
*G01D 5/14* (2006.01)
*G01D 5/244* (2006.01)

(52) U.S. Cl.
CPC .............. *G01D 5/14* (2013.01); *G01D 5/145* (2013.01); *G01D 5/24485* (2013.01)

(58) Field of Classification Search
CPC ........ G01D 5/145; G01D 5/2448; G01B 7/14; G01B 7/023; G01R 33/025; G01R 33/07
(Continued)

(56) References Cited

U.S. PATENT DOCUMENTS

| 6,064,197 A | * | 5/2000 | Lochmann | ............... G01B 7/30 324/207.14 |
| 2005/0205344 A1 | * | 9/2005 | Uryu | ...................... B62D 5/046 180/446 |

(Continued)

FOREIGN PATENT DOCUMENTS

| JP | 2005-164551 A | 6/2005 |
| JP | 2008-256486 A | 10/2008 |

(Continued)

OTHER PUBLICATIONS

Apr. 5, 2016 International Search Report issued in International Patent Application No. PCT/JP2016/050852.

*Primary Examiner* — Christopher P McAndrew
(74) *Attorney, Agent, or Firm* — Oliff PLC (57) ABSTRACT

A rotation angle detection apparatus includes a magnet that is provided to a rotating shaft of a rotating body and rotates with the rotating shaft to generate magnetic flux and a magnetic sensor that is provided at a distance from the magnet and detects a magnetic flux interlinked with the magnetic sensor. The rotation angle detection apparatus has a magnet magnetic flux detection circuit that detects a magnet magnetic flux generated from the magnet, a disturbance magnetic flux detection circuit that detects a disturbance magnetic flux, which is a magnetic flux other than the magnet magnetic flux and is interlinked with the magnetic sensor, and a correction circuit that corrects a result of detection of the magnetic sensor based on a result of detection of the magnet magnetic flux detection circuit and (Continued)

a result of detection of the disturbance magnetic flux detection circuit.

10 Claims, 4 Drawing Sheets

(58) Field of Classification Search
USPC .................................................... 324/207.12
See application file for complete search history.

(56) References Cited

U.S. PATENT DOCUMENTS

| | | | | |
|---|---|---|---|---|
| 2007/0199773 A1* | 8/2007 | Saito | ........................ | B60T 8/321 |
| | | | | 188/72.1 |
| 2013/0063061 A1* | 3/2013 | Hanada | .................... | H02P 27/08 |
| | | | | 318/400.14 |
| 2016/0118923 A1* | 4/2016 | Kano | ........................ | H02P 25/22 |
| | | | | 318/400.02 |

FOREIGN PATENT DOCUMENTS

| | | | |
|---|---|---|---|
| JP | 2012-18081 A | | 1/2012 |
| JP | 2012018081 A | * | 1/2012 |

* cited by examiner

FIG.6

ROTATION ANGLE DETECTION APPARATUS

TECHNICAL FIELD

The present invention relates to a rotation angle detection apparatus that includes a magnet rotating with a rotating shaft and a magnetic sensor that is provided at a distance from the magnet and detects an interlinkage magnetic flux.

BACKGROUND ART

Conventionally, as a rotation angle detection apparatus, which includes a magnet rotating with a rotating shaft, and a magnetic sensor that is provided at a distance from the magnet and detects an interlinkage magnetic flux, for example, an angle sensor is disclosed in patent literature 1.

The angle sensor includes a magnet and a magnetic field sensor element. The magnet is provided to the rotating shaft and rotates with the rotating shaft to generate a magnetic flux. The magnetic sensor element is provided at a distance from the magnet and detects an interlinkage magnetic flux to output a signal corresponding to the result of the detection.

CITATION LIST

Patent Literature

[Patent Literature 1] JP-A-11-094512

SUMMARY OF THE INVENTION

Technical Problem

Meanwhile, in the angle sensor described above, if the temperature changes, the magnetic flux generated from the magnet changes. As a result, the magnetic flux interlinked with the magnetic sensor element changes, whereby the output signal of the magnetic sensor element changes. That is, a rotation angle error is produced.

In the angle sensor described above, when a target of the detection of a rotation angle is a motor, the magnet is provided to an end of the rotating shaft, and the magnetic sensor element is provided in the vicinity of the end of the rotating shaft. In a case where field windings of the motor are provided to a rotor core rotating with the rotating shaft, when a current flows to the field windings, a magnetic flux may leak from the end of the rotating shaft. As a result, the leakage flux is interlinked with the magnetic field sensor element as a disturbance magnetic flux, whereby the output signal of the magnetic field sensor element changes. That is, a rotation angle error is produced.

Solution to Problem

An embodiment provides a rotation angle detection apparatus that, even when a magnet magnetic flux changes, or a disturbance magnetic flux is applied, a rotation angle error due to them can be prevented from being generated.

A rotation angle detection apparatus of an embodiment includes a magnet that is provided to a rotating shaft of a rotating body and rotates with the rotating shaft to generate magnetic flux and a magnetic sensor that is provided at a distance from the magnet and detects a magnetic flux interlinked with the magnetic sensor. The rotation angle detection apparatus has a magnet magnetic flux detection circuit that detects a magnet magnetic flux generated from the magnet, a disturbance magnetic flux detection circuit that detects a disturbance magnetic flux, which is a magnetic flux other than the magnet magnetic flux and is interlinked with the magnetic sensor, and a correction circuit that corrects a result of detection of the magnetic sensor based on a result of detection of the magnet magnetic flux detection circuit and a result of detection of the disturbance magnetic flux detection circuit.

DESCRIPTION OF THE EMBODIMENTS

Hereinafter, embodiments of the present invention will be described with reference to the drawings. In the present embodiment, a rotation angle detection apparatus detects a rotation angle of a motor in a motor drive system.

First Embodiment

First, referring to FIG. 1 and FIG. 2, the configuration of a motor of the first embodiment will be described. A motor drive system 1 shown in FIG. 1 generates torque by driving the motor. The motor drive system 1 includes a motor 10, a rotation angle detection apparatus 11, and a motor driving unit 12.

The motor 10 generates torque by a current flowing to the motor 10. The motor 10 includes a housing 100, a stator 101, and a rotor 102.

The housing 100 is a member that accommodates the stator 101 and the rotor 102 and rotatably supports the rotor 102. The housing 100 includes bearings 100a and 100b.

The stator 101 is a member that configures part of a flux path, and generates a magnetic flux by being supplied with a three-phase alternating current to form a rotating magnetic field. The stator 101 includes a stator core 101a and a stator winding 101b.

The stator coil 101a is a cylindrical member that configures part of a flux path and is formed of a magnetic material holding the stator winding 101b. The stator coil 101a includes a plurality of slots (not shown) accommodating the stator winding 101b. The stator coil 101a is fixed to the inner peripheral surface of the housing 100.

The stator winding 101b is a member that generates a magnetic flux by being supplied with a three-phase alternating current and forms a rotating magnetic field. The stator winding 101b is accommodated in the slots of the stator core 101a so as to be held.

The rotor 102 is a member that configures part of a flux path and generates a magnetic flux by being supplied with a direct current to form a magnetic field. The rotor 102 includes a rotating shaft 102a, a rotor core 102b, and a field winding 102c.

The rotating shaft 102a is a columnar member formed of a magnetic material. The rotating shaft 102a is rotatably supported by the housing 100 via the bearings 100a and 100b.

The rotor core 102b is a member that configures part of a flux path and is formed of a magnetic material holding the field winding 102c. The rotor core 102b is a so-called Lundell pole core. The rotor core 102b is fixed to the rotating shaft 102a in a state where the outer peripheral surface thereof is opposed to the inner peripheral surface of the stator core 101a. The rotor core 102b is rotatably supported by the housing 100.

The field winding 102c is a member that is supplied with a direct current through a slip ring (not shown) to generate a magnetic flux, thereby forming a magnetic field in the rotor core 102b. The field winding 102c is cylindrically wound around the rotor core 102b.

The rotation angle detection apparatus 11 is an apparatus detecting a rotation angle of the rotating shaft 102a. The rotation angle detection apparatus 11 includes a magnet 110, a magnetic sensor 111, a magnet magnetic flux detection circuit 112, a disturbance magnetic flux detection circuit 113, and a correction circuit 114.

The magnet 110 is a disc-shaped member generating a magnetic flux. One of the semicircular portions of a circular surface of the magnet 110 is provided with an N pole, and the other of the semicircular portions of the circular surface of the magnet 110 is provided with an S pole. The magnet 110 is fixed to an end portion of the rotating shaft 102a in a state where the center of the circle agrees with the shaft center of the rotating shaft 102a.

The magnetic sensor 111 is an element detecting a magnetic flux interlinked with the magnetic sensor 111 in a predetermined direction. Specifically, the magnetic sensor 111 detects a magnetic flux interlinked with the magnetic sensor 111 in a direction orthogonal to the thickness direction of the magnetic sensor 111, and outputs a signal corresponding to the result of the detection. The magnetic sensor 111 is provided at a distance from the magnet 110 in a state where the magnetic sensor 111 is mounted on a circuit board 111a. The magnetic sensor 111 is provided so that the thickness direction thereof is the axial direction of the rotating shaft 102a and the center thereof agrees with the shaft center of the rotating shaft 102a. An output terminal of the magnetic sensor 111 is connected to the correction circuit 114.

The magnet magnetic flux detection circuit 112 detects a magnet magnetic flux generated from the magnet 110. The magnet magnetic flux changes with the temperature. Specifically, the magnet magnetic flux detection circuit 112 detects a temperature in the vicinity of the magnet 110, the temperature having a correspondence relation with a magnet magnetic flux. The magnet magnetic flux detection circuit 112 includes a temperature sensor 112a.

The temperature sensor 112a is an element detecting a temperature in the vicinity of the magnet 110. The temperature sensor 112a is mounted on the circuit board 111a, which is a non-rotational part, and near the magnetic sensor 111. An output terminal of the temperature sensor 112a is connected to the correction circuit 114.

The disturbance magnetic flux detection circuit 113 detects a disturbance magnetic flux, which is a magnetic flux other than the magnetic flux generated from the magnet 110 and is interlinked with the magnetic sensor 111. When a current flows to the field winding 102c of the motor 10, a magnetic flux is generated. Since the rotating shaft 102a is formed of a magnetic material, part of the generated magnetic flux may leak from the end portion of the magnet 110 side of the rotating shaft 102a to the outside of the motor 10. The disturbance magnetic flux detection circuit 113 detects a leakage flux, which is included in the flux generated by the current flowing to the field winding 102c and leaks from the end portion of the magnet 110 side of the rotating shaft 102a to the outside of the motor 10, as a disturbance magnetic flux. The leakage flux, which is the disturbance magnetic flux, changes with the current flowing to the field winding 102c. Specifically, the disturbance magnetic flux detection circuit 113 detects a current flowing to the field winding 102c, the current having a correspondence relation with a leakage flux, which is a disturbance magnetic flux. The disturbance magnetic flux detection circuit 113 includes a current sensor 113a.

The current sensor 113a is an element that detects a current flowing to the field winding 102c. The current sensor 113a is provided in a state where the current sensor 113a is clamped to a line 120 described later, which connects the motor driving unit 12 and the field winding 102c. An output terminal of the current sensor 113a is connected to the correction circuit 114.

The correction circuit 114 corrects the result of the detection of the magnetic sensor 111 based on the result of the detection of the magnet magnetic flux detection circuit 112 and the result of the detection of the disturbance magnetic flux detection circuit 113. Specifically, the correction circuit 114 calculates a rotation angle error based on the result of the detection of the magnet magnetic flux detection circuit 112, the result of the detection of the disturbance magnetic flux detection circuit 113, and rotation angle error calculation data representing a relationship among a magnet magnetic flux, a disturbance magnetic flux, and a rotation angle error, and corrects the result of the detection of the magnetic sensor 111. The rotation angle error calculation data represents a relationship among a magnet magnetic flux, a disturbance magnetic flux, and a rotation angle error, which is previously determined by experiments or simulations. Specifically, as shown in FIG. 2, the error calculation data indicates a relationship among a temperature in the vicinity of the magnet 110, a current flowing to the field winding 102c, and the absolute value of a rotation angle error. The correction circuit 114 includes a memory circuit 114a, a correction amount calculation circuit 114b, and a correction process circuit 114c.

The memory circuit 114a stores the rotation angle error calculation data. An output terminal of the memory circuit 114a is connected to the correction amount calculation circuit 114b.

The correction amount calculation circuit 114b calculates an amount of correction for eliminating the rotation angle error based on the result of the detection of the magnet magnetic flux detection circuit 112, the result of the detection of the disturbance magnetic flux detection circuit 113, and the rotation angle error calculation data stored in the memory circuit 114a. Specifically, the correction amount calculation circuit 114b calculates the amount of correction based on the temperature in the vicinity of the magnet 110 detected by the temperature sensor 112a, the current flowing to the field winding 102c detected by the current sensor 113a, and the rotation angle error calculation data representing a relationship among a temperature in the vicinity of the magnet 110, a current flowing to the field winding 102c, and the absolute value of a rotation angle error, the rotation angle error calculation data being stored in the memory circuit 114*a*. An input terminal of the correction amount calculation circuit 114*b* is connected to an output terminal of the temperature sensor 112*a*, an output terminal of the current sensor 113*a*, and an output terminal of the memory circuit 114*a*. An output terminal of the correction amount calculation circuit 114*b* is connected to the correction process circuit 114*c*.

The correction process circuit 114*c* corrects the result of the detection of the magnetic sensor 111 based on the result of the calculation of the correction amount calculation circuit 114*b*, and outputs the corrected result of the detection to the motor driving unit 12 as a rotation angle of the rotating shaft 102*a*. An input terminal of the correction process circuit 114*c* is connected to an output terminal of the correction amount calculation circuit 114*b* and an output terminal of the magnetic sensor 111. An output terminal of the correction process circuit 114*c* is connected to the motor driving unit 12.

The motor driving unit 12 supplies a direct current to the field winding 102*c* and supplies a three-phase alternating current to the stator winding 101*b* based on the rotation angle input from the correction process circuit 114*c*, to drive the motor 10. An input terminal of the motor driving unit 12 is connected to an output terminal of the correction process circuit 114*c*. A direct current output terminal of the motor driving unit 12 is connected to the field winding 102*c* via lines 120 and 121 and a slip ring. An AC output terminal of the motor driving unit 12 is connected to the stator winding 101*b* via lines 122 to 124.

Next, an operation of the motor drive system according to the first embodiment will be described with reference to FIG. 1 to FIG. 5.

Figure 1:
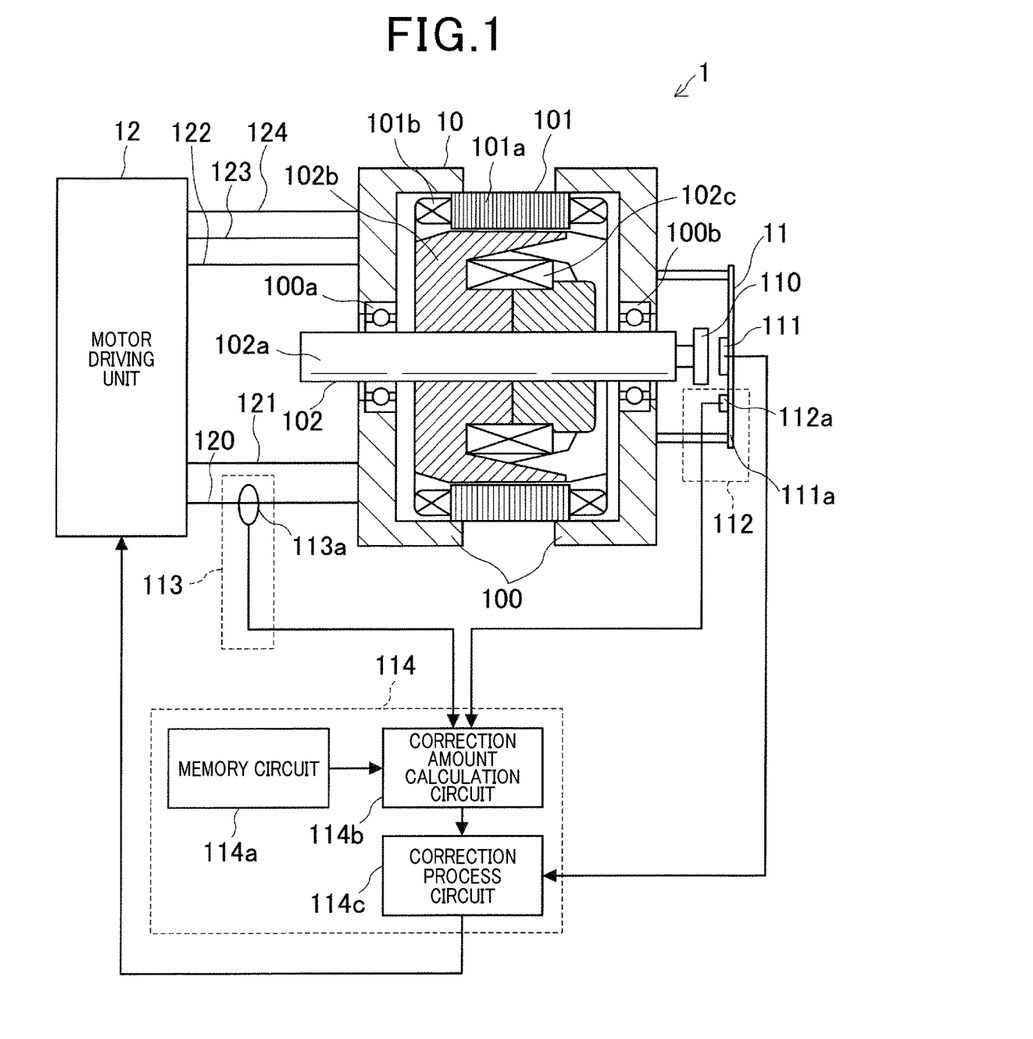
FIG. 1 is a circuit diagram of a motor drive system according to a first embodiment.
Figure 3:
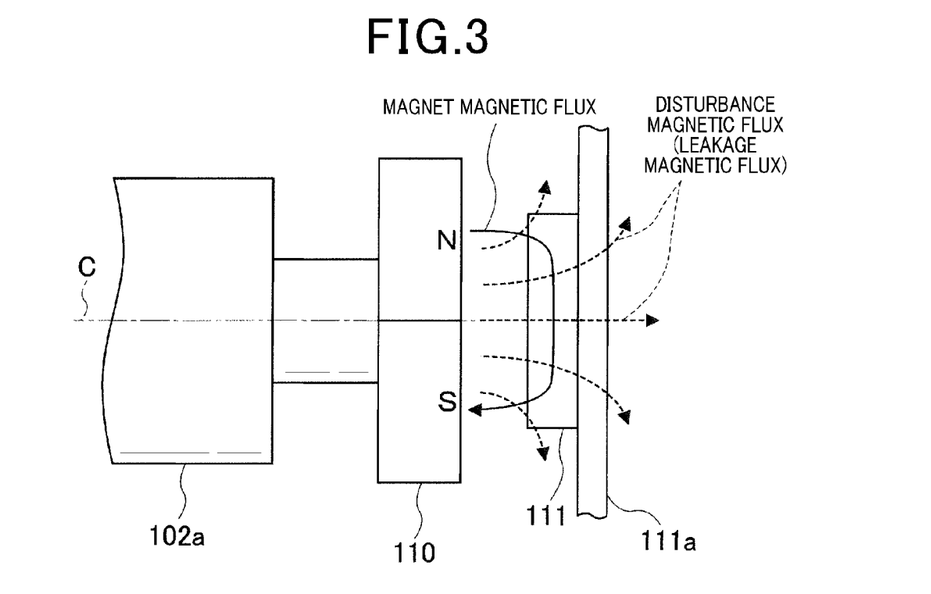
FIG. 3 is an enlarged view of the periphery of a magnetic sensor in FIG. 1 for illustrating a flow of a magnetic flux in the vicinity of the magnetic sensor.

The magnet 110 shown in FIG. 1 generates a magnetic flux. As shown in FIG. 3, a magnet magnetic flux generated from the magnet 110 flows on the circular surface of the magnet 110 from the N pole provided to one of the semicircular portions to the S pole provided to the other of the semicircular portions. Hence, the magnetic flux is interlinked with the magnetic sensor 111 in the direction orthogonal to the thickness direction of the magnetic sensor 111.

The disturbance magnetic flux generated by the current flowing to the field winding 102*c* flows from one end portion of the magnet 100 side of the rotating shaft 102*a* to the other end portion. When the center of the magnetic sensor 111 is provided so as to agree with the shaft center C of the rotating shaft 102*a*, the disturbance magnetic flux is not interlinked with the magnetic sensor 111 in the direction orthogonal to the thickness direction of the magnetic sensor 111. Thus, only the magnet magnetic flux is interlinked with the magnetic sensor 111 in the direction orthogonal to the thickness direction of the magnetic sensor 111.

Figure 4:
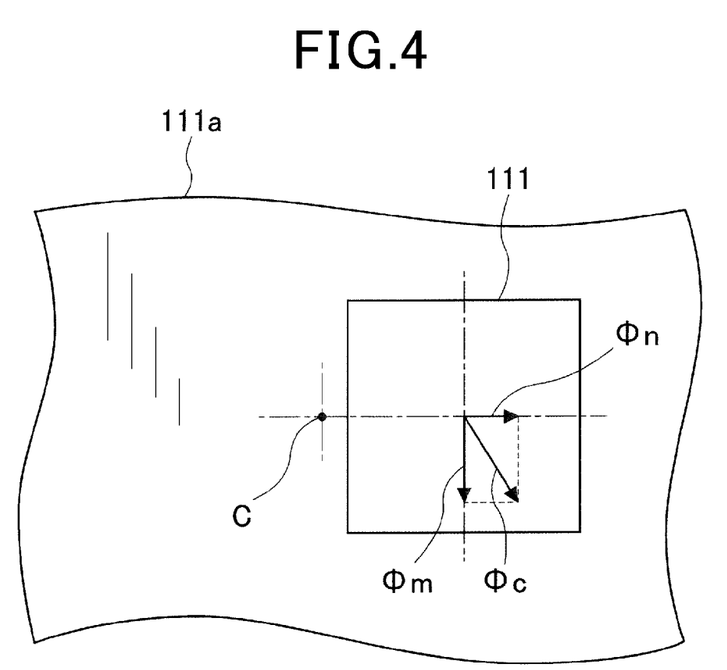
FIG. 4 is a plan view of the magnetic sensor viewed from a magnet side in FIG. 3 for illustrating a magnetic interlinked with the magnetic sensor.

However, even when the center of the magnetic sensor 111 is provided so as to agree with the shaft center C of the rotating shaft 102*a*, position displacement is caused in a practical sense. As shown in FIG. 4, when the center of the magnetic sensor 111 is provided at a position displaced from the shaft center C of the rotating shaft 102*a*, a disturbance magnetic flux is interlinked with the magnetic sensor 111 in the direction orthogonal to the thickness direction of the magnetic sensor 111. Hence, the magnetic sensor 111 assumes that a combined magnetic flux ΦC of a magnet magnetic flux Φm and a disturbance magnetic flux Φn, which are interlinked with the magnetic sensor 111 in the direction orthogonal to the thickness direction, as a magnet magnetic flux interlinked with the magnetic sensor 111 in the direction orthogonal to the thickness direction. Thus, a rotation angle error is produced.

The magnet magnetic flux changes with the change to the temperature of the magnet 110. Hence, the magnetic flux interlinked with the magnetic sensor 111 in the direction orthogonal to the thickness direction of the magnetic sensor 111 changes with the change of the temperature of magnet 110. Hence, a rotation angle error is also produced due to the temperature change of the magnet 110.

The temperature sensor 112*a* shown in FIG. 1 detects a temperature in the vicinity of the magnet 110. The current sensor 113*a* detects a current flowing to the field winding 102*c* of the motor 10.

Figure 2:
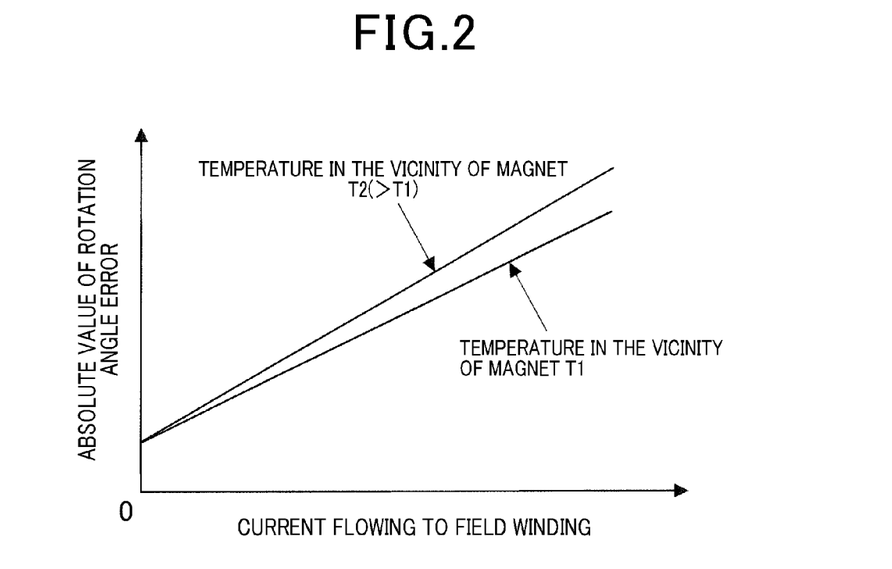
FIG. 2 is a diagram illustrating rotation angle error detection data.
Figure 5:
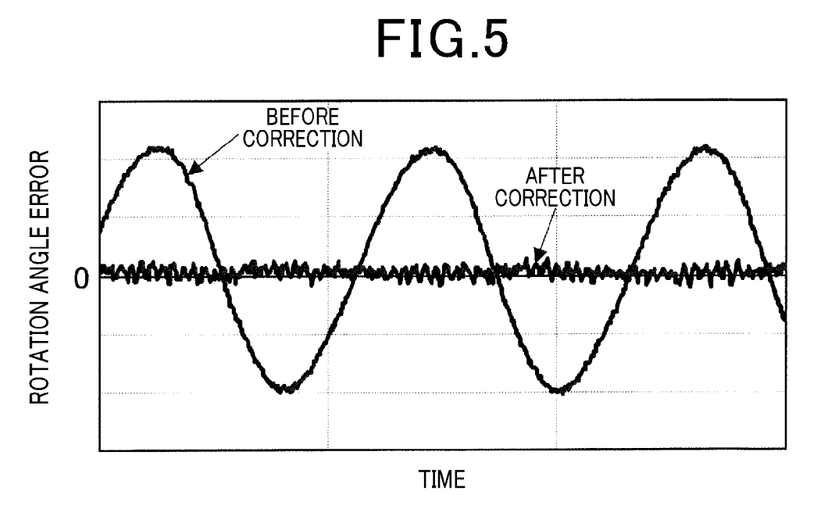
FIG. 5 is measurement data of a rotation angle error when a motor is rotated at a constant speed, and FIG. 6 a circuit diagram of a motor drive system according to a second embodiment.

The correction amount calculation circuit 114*b* calculates an amount of correction based on the temperature in the vicinity of the magnet 110 detected by the temperature sensor 112*a*, the current flowing to the field winding 102*c* detected by the current sensor 113*a*, and the rotation angle error calculation data, shown in FIG. 2, representing a relationship among the temperature in the vicinity of the magnet 110, the current flowing to the field winding 102*c*, and the absolute value of the rotation angle error. The correction process circuit 114*c* corrects the result of the detection of the magnetic sensor 111 based on the result of the calculation of the correction amount calculation circuit 114*b*, and outputs the corrected result of the calculation to the motor driving unit 12 as a rotation angle of the rotating shaft 102*a*. As a result, as shown in FIG. 5, the rotation angle error can be almost 0.

The motor driving unit 12 supplies a direct current to the field winding 102*c* and supplies a three-phase alternating current to the stator winding 101*b* based on the rotation angle input from the correction process circuit 114*c*, to drive the motor 10. Thereby, the motor 10 generates torque.

Next, effects of the motor drive system of the first embodiment will be described.

According to the first embodiment, the rotation angle detection apparatus 11 includes the magnet magnetic flux detection circuit 112, the disturbance magnetic flux detection circuit 113, and the correction circuit 114. The magnet magnetic flux detection circuit 112 detects a magnet magnetic flux. The disturbance magnetic flux detection circuit 113 detects a disturbance magnetic flux, which is a flux other than the magnet magnetic flux and is interlinked with the magnetic sensor 111. The correction circuit 114 corrects the result of the detection of the magnetic sensor 111 based on the result of the detection of the magnet magnetic flux detection circuit 112 and the result of the detection of the disturbance magnetic flux detection circuit 113. Hence, the result of the detection of the magnetic sensor 111 can be corrected based on the magnet magnetic flux and the disturbance magnetic flux. Therefore, even when the magnet magnetic flux changes, or a disturbance magnetic flux is applied, a rotation angle error due to them can be prevented from being generated.

According to the first embodiment, the correction circuit 114 calculates a rotation angle error based on the result of the detection of the magnet magnetic flux detection circuit 112, the result of the detection of the disturbance magnetic flux detection circuit 113, and the rotation angle error calculation data, and corrects the result of the detection of the magnetic sensor 111. The rotation angle error calculation data represents a relationship, which is previously determined by experiments or simulations, among a magnet magnetic flux, a disturbance magnetic flux, and a rotation angle error. Hence, a rotation angle error can be calculated based on the magnet magnetic flux and the disturbance magnetic flux. Hence, the detection result of the magnetic sensor 111 can be corrected so as to eliminate the rotation angle error. Therefore, even when the magnet magnetic flux changes, or a disturbance magnetic flux is applied, a rotation angle error due to them can be reliably prevented from being generated.

According to the first embodiment, the magnet magnetic flux detection circuit 112 includes the temperature sensor 112a. The temperature sensor 112a is an element that detects a temperature in the vicinity of the magnet 110 having a correspondence relation with a magnet magnetic flux. Thus, a magnet magnetic flux can be reliably detected.

According to the first embodiment, the temperature sensor 112a is mounted on the circuit board 111a and in the vicinity of the magnetic sensor 111. That is, the temperature sensor 112a is provided in the vicinity of the magnet 110. Thus, a temperature in the vicinity of the magnet 110 can be reliably detected.

According to the first embodiment, the temperature sensor 112a is mounted on the circuit board 111a, which is a non-rotational part. Thus, compared with a case where the temperature sensor 112a is provided on a rotational part, wiring can be easily carried out. Therefore, the formation of the wiring can be simplified.

According to the first embodiment, a rotating body to be detected by the rotation angle detection apparatus 11 is the motor 10 having the field winding 102c. Hence, when a current flows to the field winding 102c, a magnetic flux may leak to the outside of the motor 10 and may be applied to the magnetic sensor 111. The disturbance magnetic flux detection circuit 113 detects a leakage flux, which is generated by a current flow to the field windings and leaks to the outside of the motor, as a disturbance magnetic flux. Thus, a disturbance magnetic flux interlinked with the magnetic sensor 111 can be reliably detected.

According to the first embodiment, the disturbance magnetic flux detection circuit 113 includes the current sensor 113a. The current sensor 113a is an element detecting a current flowing to the field winding 102c having a correspondence relation with a disturbance magnetic flux. Thus, a disturbance magnetic flux can be reliably detected.

According to the first embodiment, the field winding 102c is wound around the rotor core 102b rotating with the rotating shaft 102a. Hence, more magnetic flux may leak from the end portion of the magnet 110 side of the rotating shaft 102a. That is, more disturbance magnetic flux may be generated. However, the result of detection of the magnetic sensor 111 can be corrected based on the magnet magnetic flux and the disturbance magnetic flux. Thus, even in a configuration in which more disturbance magnetic flux is applied to the magnetic sensor 111, a rotation angle error can be reliably prevented from being produced.

It is noted that, the first embodiment describes an example in which the temperature sensor 112a is provided to the circuit board 111a, which is a non-rotational part, and detects a temperature in the vicinity of the magnet 110. However, this is not the limited example. The temperature sensor 112a may be provided to a rotational part of the motor 10 to detect a temperature in the vicinity of the magnet 110. In addition, the temperature sensor 112a may be provided to the magnet 110, which is a rotational part, to directly detect a temperature of the magnet 110. That is, the temperature sensor 112a may detect at least one of temperatures of the magnet 110 and in the vicinity of the magnet 110.

The first embodiment describes an example in which the magnet magnetic flux detection circuit 112 detects a temperature in the vicinity of the magnet 110 having a correspondence relation with a magnet magnetic flux. However, this is not the limited example. The magnet magnetic flux detection circuit 112 may directly detect a magnet magnetic flux. In addition, the magnet magnetic flux detection circuit 112 may detect another physical quantity having a correspondence relation with a magnet magnetic flux.

The first embodiment describes an example in which the disturbance magnetic flux detection circuit 113 detects a current flowing to the field winding 102c having a correspondence relation with a disturbance magnetic flux. However, this is not the limited example. The disturbance magnetic flux detection circuit 113 may directly detect a disturbance magnetic flux, which is a flux other than the magnet magnetic flux and is interlinked with the magnetic sensor. In addition, the disturbance magnetic flux detection circuit 113 may detect another physical quantity having a correspondence relation with a disturbance magnetic flux.

Second Embodiment

Next, a motor drive system of the second embodiment will be described. The motor drive system of the second embodiment is configured by modifying the configuration of the magnet magnetic flux detection circuit of the motor drive system of the first embodiment.

Since the configurations and operations other than those of the magnet magnetic flux detection circuit are the same as those of the first embodiment, the descriptions thereof are omitted if not necessary.

First, referring to FIG. 6, the configuration of the motor drive system of the second embodiment will be described. Since the configurations other than that of the magnet magnetic flux detection circuit are the same as those of the first embodiment, the descriptions thereof are omitted if not necessary.

Figure 6:
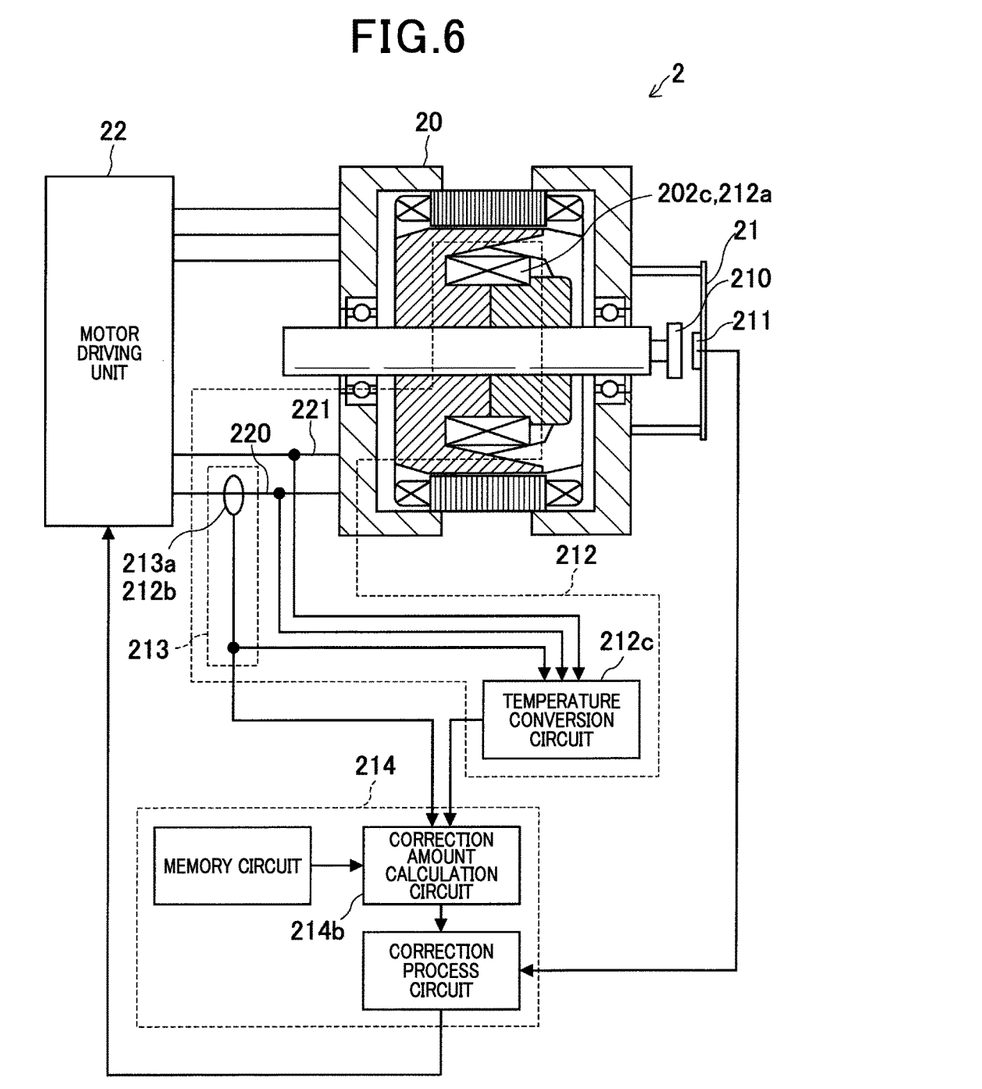

As shown in FIG. 6, a motor drive system 2 includes a motor 20, a rotation angle detection apparatus 21, and a motor driving unit 22. The motor 20 and the motor driving unit 22 have the same configurations as those of the motor 10 and the motor driving unit 12 of the first embodiment.

The rotation angle detection apparatus 21 includes a magnet 210, a magnetic sensor 211, a magnet magnetic flux detection circuit 212, a disturbance magnetic flux detection circuit 213, and a correction circuit 214.

The magnet 210, the magnetic sensor 211, the disturbance magnetic flux detection circuit 213, and the correction circuit 214 have the same configurations as those of the magnet 110, the magnetic sensor 111, the disturbance magnetic flux detection circuit 113, and the correction circuit 114, respectively.

The magnet magnetic flux detection circuit 212 detects a magnet magnetic flux generated by the magnet 210. Specifically, the magnet magnetic flux detection circuit 212 detects a temperature in the vicinity of the magnet 210 having a correspondence relation with a magnet magnetic flux. The magnet magnetic flux detection circuit 212 includes a temperature sensor 212a, a current sensor 212b, and a temperature conversion circuit 212c.

The temperature sensor 212a is a member detecting a temperature in the vicinity of the magnet 210. Specifically, the temperature sensor 212a includes a field winding 202c that is provided in the vicinity of the magnet 210 and whose resistance value changes with temperature.

The current sensor 212b is an element that detects a current flowing to the field winding 202c. Specifically, the current sensor 212b includes a current sensor 213a configuring the disturbance magnetic flux detection circuit 213.

The temperature conversion circuit 212c detects a resistance value of the field winding 202c, which is the temperature sensor 212a, and converts the resistance value to a temperature. The temperature conversion circuit 212c calculates a resistance value of the field winding 202c based on the current flowing to the field winding 202c and the voltage applied to the field winding 202c, and converts the resistance value to a temperature. An input terminal of the temperature conversion circuit 212c is connected to an output terminal of the current sensor 212b. In addition, the input terminal of the temperature conversion circuit 212c is connected to lines 220 and 221 connecting the motor driving unit 22 and the field winding 202c to detect a voltage applied to the field winding 202c. Furthermore, an output terminal of the temperature conversion circuit 212c is connected to a correction amount calculation circuit 214b.

Next, an operation of the motor drive system according to the second embodiment will be described. Since operations other than that of the magnet magnetic flux detection circuit are the same as those of the first embodiment, the descriptions thereof are omitted if not necessary.

The temperature conversion circuit 212c calculates a resistance value of the field winding 202c based on the current flowing to the field winding 202c detected by the current sensor 212b and the voltage applied to the field winding 202c detected by the temperature conversion circuit 212c. Then, the temperature conversion circuit 212c converts the resistance value to a temperature. As a result, a temperature in the vicinity of the magnet 210 can be detected. The correction circuit 214 uses the temperature to correct the result of the detection of the magnetic sensor 211 as in the case of the first embodiment.

Next, effects of the motor drive system of the second embodiment will be described.

Since the second embodiment includes the same configurations as those of the first embodiment, the effects corresponding to the configurations and similar to those of the first embodiment can be obtained.

According to the second embodiment, the temperature sensor 212a is the field winding 202c that is provided in the vicinity of the magnet 210 and whose resistance value changes with temperature. That is, the temperature sensor 212a is configured by using the field winding 202c. Hence, an additional temperature sensor is not required to be provided. Therefore, the configuration can be simplified.

It is noted that, as in the case of the first embodiment, the second embodiment describes an example in which the magnet magnetic flux detection circuit 212 detects a temperature in the vicinity of the magnet 210 having a correspondence relation with a magnet magnetic flux. However, this is not the limited example. The magnet magnetic flux detection circuit 212 may directly detect a magnet magnetic flux. In addition, the magnet magnetic flux detection circuit 212 may detect another physical quantity having a correspondence relation with a magnet magnetic flux.

As in the case of the first embodiment, the second embodiment describes an example in which the disturbance magnetic flux detection circuit 213 detects a current flowing to the field winding 202c having a correspondence relation with a disturbance magnetic flux. However, this is not the limited example. The disturbance magnetic flux detection circuit 213 may directly detect a disturbance magnetic flux, which is a flux other than the magnet magnetic flux and is interlinked with the magnetic sensor. In addition, the disturbance magnetic flux detection circuit 213 may detect another physical quantity having a correspondence relation with a disturbance magnetic flux.

A rotation angle detection apparatus of an embodiment includes a magnet (110, 210) that is provided to a rotating shaft of a rotating body and rotates with the rotating shaft to generate magnetic flux and a magnetic sensor (111, 211) that is provided at a distance from the magnet and detects a magnetic flux interlinked with the magnetic sensor. The rotation angle detection apparatus has a magnet magnetic flux detection circuit (112, 212) that detects a magnet magnetic flux generated from the magnet, a disturbance magnetic flux detection circuit (113, 213) that detects a disturbance magnetic flux, which is a magnetic flux other than the magnet magnetic flux and is interlinked with the magnetic sensor, and a correction circuit (114, 214) that corrects a result of detection of the magnetic sensor based on a result of detection of the magnet magnetic flux detection circuit and a result of detection of the disturbance magnetic flux detection circuit.

According to this configuration, the result of detection of the magnetic sensor can be corrected based on the magnet magnetic flux and the disturbance magnetic flux. Hence, even when the magnet magnetic flux changes, or the disturbance magnetic flux is applied, a rotation angle error due to them can be prevented from being generated.

REFERENCE SIGNS LIST

1 . . . motor drive system,
10 . . . motor,
102 . . . rotor,
102a . . . rotating shaft,
102b . . . rotor core,
102c . . . field winding,
11 . . . rotation angle detection apparatus,
110 . . . magnet,
111 . . . magnetic sensor,
12 . . . magnet magnetic flux detection circuit,
112a . . . temperature sensor
113 . . . disturbance magnetic flux detection circuit,
113a . . . current sensor,
114 . . . correction circuit

The invention claimed is:

1. A rotation angle detection apparatus that includes: a magnet that is provided to a rotating shaft of a rotating body and rotates with the rotating shaft to generate magnetic flux; and a magnetic sensor that is provided to face the magnet and detects a magnetic flux interlinked with the magnetic sensor, the apparatus comprising:
   a magnet magnetic flux detection circuit that detects a magnet magnetic flux generated from the magnet;
   a disturbance magnetic flux detection circuit that has a relationship between a disturbance magnetic flux and a field current flowing through a field winding of the rotating body, the disturbance magnetic flux being a magnetic flux other than the magnet magnetic flux and being interlinked with the magnetic sensor, the disturbance magnetic flux detection circuit being configured to:
      measure a value of the field current; and
      detect, based on the relationship, a value of the magnetic flux that corresponds to the measured value of the field current; and
   a correction circuit that corrects a result of detection of the magnetic sensor based on a result of detection of the magnet magnetic flux detection circuit and a result of detection of the disturbance magnetic flux detection circuit.

2. The rotation angle detection apparatus according to claim 1, wherein
the correction circuit calculates a rotation angle error based on the result of detection of the magnet magnetic flux detection circuit, the result of detection of the disturbance magnetic flux detection circuit, and rotation angle error calculation data representing a relationship among a magnet magnetic flux, a disturbance magnetic flux, and a rotation angle error, and corrects the result of detection of the magnetic sensor.

3. The rotation angle detection apparatus according to claim 1, wherein
the magnet magnetic flux detection circuit has a temperature sensor that detects at least one of a temperature of the magnet and an ambient temperature around the magnet.

4. The rotation angle detection apparatus according to claim 3, wherein
the temperature sensor is provided to at least one of the magnet and the periphery of the magnet.

5. The rotation angle detection apparatus according to claim 4, wherein
the temperature sensor is provided to a non-rotational part.

6. The rotation angle detection apparatus according to claim 4, wherein
the rotating body is a motor having the field winding,
a resistance value of the field winding changes with temperature, and
the field winding is the temperature sensor.

7. The rotation angle detection apparatus according to claim 1, wherein
the rotating body is a motor having a field winding, and
the disturbance magnetic flux detection circuit detects a leakage flux, which is included in a magnetic flux generated by a current flowing to the field winding and leaks to the outside of the motor, as a disturbance magnetic flux.

8. The rotation angle detection apparatus according to claim 7, wherein
the disturbance magnetic flux detection circuit has a current sensor that detects a current flowing to the field winding.

9. The rotation angle detection apparatus according to claim 6, wherein
the field winding is provided to a rotor core rotating with the rotating shaft.

10. A rotation angle detection apparatus that includes: a magnet that is provided to a rotating shaft of a rotating body and rotates with the rotating shaft to generate magnetic flux; and a magnetic sensor that is provided to face the magnet and detects a magnetic flux interlinked with the magnetic sensor, the apparatus comprising:
a disturbance magnetic flux detection circuit that has a relationship between a disturbance magnetic flux and a physical quantity correlating with the disturbance magnetic flux, the disturbance magnetic flux being a magnetic flux other than the magnet magnetic flux and being interlinked with the magnetic sensor, the disturbance magnetic flux detection circuit being configured to:
measure a value of the physical quantity; and
detect, based on the relationship, a value of the magnetic flux that corresponds to the measured value of the physical quantity; and
a correction circuit that corrects a result of detection of the magnetic sensor based on a result of detection of the disturbance magnetic flux circuit.

* * * * *